(12) United States Patent
Tsurushima

(10) Patent No.: US 6,575,581 B2
(45) Date of Patent: Jun. 10, 2003

(54) IMAGE PROJECTION METHOD AND IMAGE PROJECTOR

(75) Inventor: Katsuaki Tsurushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/751,015

(22) Filed: Dec. 28, 2000

(65) Prior Publication Data

US 2001/0005262 A1 Jun. 28, 2001

(30) Foreign Application Priority Data

Dec. 28, 1999 (JP) .............................. 11-375353
Apr. 24, 2000 (JP) ........................ 2000-127660

(51) Int. Cl.$^7$ .................. G03B 21/00; G02B 26/08; H04N 5/65
(52) U.S. Cl. ................ 353/121; 353/122; 353/30; 359/196; 348/818; 348/819
(58) Field of Search .................... 353/42, 50, 66, 353/75, 76, 79, 98, 122, 30, 31, 32, 102, 121, 94; 348/744, 764, 818, 819; 359/196; 250/202, 221, 222.1

(56) References Cited

U.S. PATENT DOCUMENTS

| | | | | |
|---|---|---|---|---|
| 5,117,221 A | * | 5/1992 | Mishica, Jr. | 340/556 |
| 6,002,505 A | * | 12/1999 | Kraenert et al. | 359/196 |
| 6,142,650 A | * | 11/2000 | Brown et al. | 362/259 |
| 6,431,731 B1 | * | 8/2002 | Krietzman | 362/259 |
| 6,460,999 B1 | * | 10/2002 | Suzuki | 353/79 |

* cited by examiner

*Primary Examiner*—Russell Adams
*Assistant Examiner*—Melissa J Koval
(74) *Attorney, Agent, or Firm*—Sonnenschein, Nath & Rosenthal

(57) ABSTRACT

An image projection method for projecting laser beams and an image projector that projects laser beams are adapted to shut down the laser beams instantaneously when an obstacle intruding into the projection area of the laser beams is detected. A detection wave is projected onto a display screen along with the laser beams for displaying an image. The reflection wave of the detection wave reflected from the display screen is detected so as to find out whether the obstacle, if any, is intruding into the projection area of the laser beams.

11 Claims, 2 Drawing Sheets

IMAGE PROJECTION METHOD AND
IMAGE PROJECTOR

BACKGROUND OF THE INVENTION

1. Field of the Invention

This invention relates to an image projection method and an image projector using a laser beam.

2. Related Background Art

Image projectors are known as image display apparatuses adapted to display a large image.

A projector has a projection tube as light source for projecting beams of light onto a display screen so as to throw an image on the display screen and the viewers see the image displayed on the display screen.

Hitherto, a highly bright projection tube is used as light source for a projector. Then, an image is displayed on a display screen which may typically be a liquid crystal panel as beams of light are projected from the projection tube.

However, known projection tubes are not satisfactory in terms of brightness and color reproducibility and hence projector systems using lasers of red, blue and green as light source have been proposed from the viewpoint of easy modulation of video signals, improved color reproducibility and enhanced brightness.

On the other hand, projector systems using laser beams face a problem of security.

For instance, laser beams can accidentally strike the eyes of viewers in the case of projector systems using laser beams and designed for home use. Laser beams are highly dangerous if they directly strike human eyes. Therefore, such a risk provides a serious problem for commercializing projector systems using laser beams regardless of the intensity of the laser beams emitted from the projector system.

BRIEF SUMMARY OF THE INVENTION

In view of the above problem, it is therefore the object of the present invention to provide an image projection method and an image projector that can ensure an enhanced level of security and are adapted to instantaneously shut down the laser beams emitted therefrom when an obstacle intersects any of the optical paths of the laser beams.

According to the invention, the above object is achieved by providing an image projection method for projecting laser beams onto a display screen to display an image, wherein a detection wave is projected onto the display screen along with the laser beams, and the detection wave reflected by the display screen is detected so as to find out an obstacle intruding into the projection area of the laser beams.

According to the invention, there is also provided an image projector comprising:

a laser beam source for projecting laser beams to display an image;

a detection wave source for projecting a detection wave;

a display screen to which the laser beams and detection wave are projected;

a reflected wave detection means for detecting the detection wave reflected by the display screen so as to find out an obstacle intruding into the projection area of the laser beams; and a laser beam shutdown mechanism for shutting down the laser beams according to the detection signal output from the reflected wave detection means.

Preferably, in the image projection method and the image projector according to the invention as defined above, the detection wave is used for detecting an obstacle.

More specifically, a detection wave is projected onto the display screen simultaneously with the laser beams for displaying an image projected onto the display screen and the detection wave reflected by the display screen is monitored. As an obstacle intrudes into the projection area of the laser beams, the detection wave is intercepted by the obstacle to give rise to a change in the intensity of the detected reflection wave. Therefore, the risk of exposing a viewer to the laser beams for a prolonged period of time can be successfully avoided by shutting down the laser beams instantaneously according to the result of the detecting operation.

The detection wave for monitoring the operation of the projector is not visually sensed by viewers so that the image displayed on the display screen is not affected by the detection wave.

In another aspect of the invention, there is also provided an image projection method for projecting laser beams onto a display screen to display an image, wherein the image displayed on the display screen is picked up, and the difference between the image to be displayed and the displayed image is detected so as to find out an obstacle intruding into the projection area of the laser beams.

According to the invention, there is also provided an image projector comprising:

a laser beam source for projecting laser beams to display an image;

a display screen to which the laser beams are projected;

an image pickup means for picking up the image displayed on the display screen;

an image processing means for detecting the difference between the image to be displayed and the displayed image so as to find out an obstacle intruding into the projection area of the laser beams; and a laser beam shutdown mechanism for shutting down the laser beams according to the detection signal output from the image processing means.

Thus, as an image is projected onto the display screenby laserbeams, the image displayed on the display screen is monitored. If an obstacle intrudes into the projection area of the laser beams, the laser beams projecting the image is intercepted by the obstacle to give rise to a difference between the image to be displayed and the displayed image. Therefore, the risk of exposing a viewer to the laser beams for a prolonged period of time can be successfully avoided by shutting down the laser beams instantaneously according to the result of the detecting operation.

In still another aspect of the invention, there is provided an image projection method for projecting laser beams onto a display screen to display an image, wherein the laser beams are projected also onto a detection area of the display screen located outside the displayed image, and the laser beams reflected by the detection area of the display screen are detected so as to find out an obstacle intruding into the projection area of the laser beams.

According to the invention, there is also provided an image projector comprising:

a laser beam source for projecting laser beams to display an image and also projecting laser beams onto a detection area located outside the displayed image;

a display screen to which the laser beams are projected;

a reflected beam detection means for detecting the laser beams reflected by the detection area of the display screen so as to find out an obstacle intruding into the projection area of the laser beams; and a laser beam shutdown mechanism for shutting down the laser beams according to the detection signal output from the reflected beam detection means.

Preferably, in the image projection method and the image projector according to the invention as defined above, the detection wave is used for detecting an obstacle.

More specifically, a laser beam for displaying an image and detecting an obstacle is projected onto the display screen and the reflected laser beam is monitored. As an obstacle intrudes into the projection area of the laser beams, the laser beams are intercepted by the obstacle to give rise to a change in the intensity of the detected reflection wave. Therefore, the risk of exposing a viewer to the laser beams for a prolonged period of time can be successfully avoided by shutting down the laser beams instantaneously according to the result of the detecting operation.

As described above, according to the invention, it is now possible to shut down the laser beams projected form a laser beam source onto a screen instantaneously when an obstacle intrudes into the projection area of the laser beams so that the present invention can provide an image projection method and an image projector that are highly safe in operation.

Additionally, if a detection wave is used for detecting an obstacle intruding into the projection area, it is not visually recognized by viewers nor affect the image projected onto the display screen. Furthermore, the detection wave is not dangerous at all.

If a laser beam is used for detecting an obstacle intruding into the projection area, the laser beam is shut down instantaneously even though it irradiates a viewer so that it does not do any harm to the viewer. Additionally, this arrangement does not require the use of a detection wave source.

DETAILED DESCRIPTION OF THE INVENTION

Now, an image projection method and an image projector according to the invention will be described by referring to the accompanying drawing that illustrate preferred embodiments of the invention.

Figure 1:
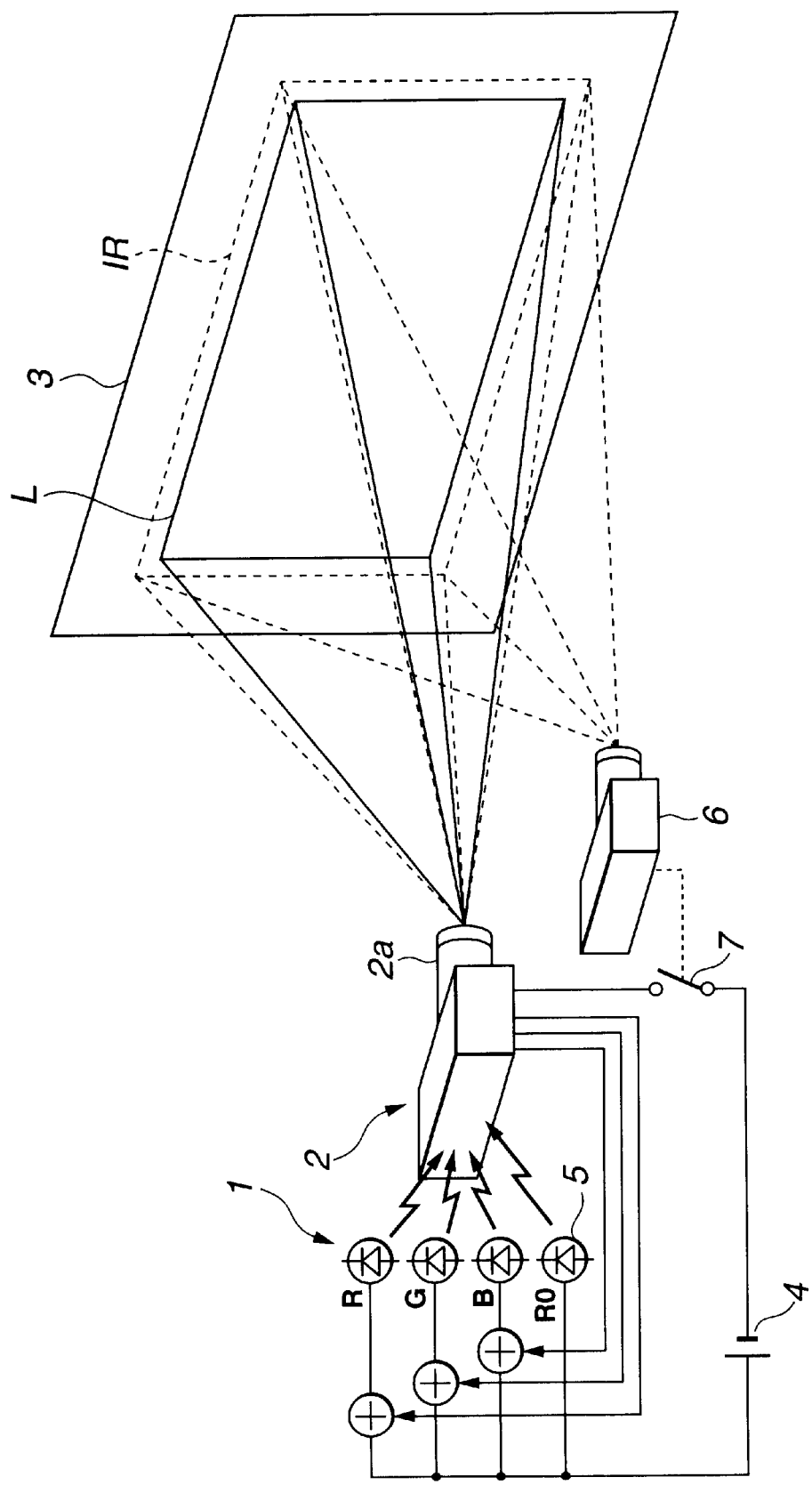
FIG. 1 is a schematic perspective view of a laser projector realized by applying the present invention.

FIG. 1 is a schematic perspective view of an embodiment of image projector (laser projector) using a laser beam source. The projector comprises a laser beam source 1, an optical modulator unit 2 and a display screen 3 to which the laser beam is projected as basic components thereof.

The laser beam source 1 have a set of lasers including a red laser R, a green laser G and a blue laser B, which lasers R, G and B are driven by a laser beam source driving power source 4.

The optical modulator unit 2 includes a modulator for modulating the laser beams of the different colors according to an image signal and an optical system. Thus, the laser beams of the different colors are modulated according to the image signal and driven to sweep typically by means of a galvano-mirror. The optical modulator unit 2 has an objective lens 2a for projecting the laser beams of the different colors from the laser beam source 1 onto the display screen 3 so that the laser beams of the different colors that are swept by the galvano-mirror are then irradiated onto the display screen 3 by way of the objective lens 2a.

In FIG. 1, the area surrounded by frame L of solid lines is the projection area of the laser beams so that an image is projected on the area defined by the frame L.

Since the laser projector having the above described configuration uses laser beams as light source, it excels any ordinary projectors in terms of brightness and color reproduction and the image signal can be modulated with ease.

While the laser projector has a basic configuration as described above, an image projector according to the invention additionally comprises a safety mechanism for preventing the laser beams from irradiating any viewer who inadvertently intrudes into the projector area.

This safety mechanism utilizes a detection wave and has a detection wave source 5 and a reflection wave sensor 6 as principal components.

The detection wave source 5 is arranged on a line with the red laser R, the green laser G and the blue laser B and the detection wave emitted from it is made to irradiate the display screen 3 by way of the objective lens 2a of the optical modulator unit 2 just like the laser beams of the different colors. In FIG. 1, the area surrounded by frame IR of broken lines is the projection area of the detection wave.

The projection frame IR of the detection wave is made larger than the projection frame L of the laser beams in this embodiment in order to detect any viewer before intruding into the irradiation area of the laser beams.

An LED for emitting infrared rays may typically be used for the detection wave source 5 because infrared rays are normally safe to the human body if they strike a viewer.

For the purpose of the present invention, a ultrasonic wave generator may alternatively be used for the detection wave source 5 because, like infrared rays, ultrasonic waves are normally safe to the human body. If a ultrasonic wave is used as detection wave for the purpose of the invention, it is directly projected onto the display screen 3 without being transmitted through the objective lens 2a.

Still alternatively, a laser may be used for the detection wave source 5 for the purpose of the invention. If such is the case, the laser beam emitted as detection wave may irradiate obstacles that may be viewers, the laser beams being emitted are instantaneously shut down upon detecting the intrusion of an obstacle so that they do not do any harm to the human body.

When a laser beam strikes an eye of a viewer, the danger on the viewer increases as a function of the product of the duration of the irradiation of the laser beam on the eye and the energy per unit time of the laser beam. However, it will be appreciated that the above arrangement is safe because the laser beam that strikes the eye the viewer is shut down instantaneously.

If a laser beam is used as detection wave, it may be projected onto the detection area located outside the area for displaying the image as pin point. Then, the pin point projection of a laser beam is by far safer to the viewer intruding into the projection area because the energy of the laser beam is very small.

On the other hand, a two-dimensional detection wave sensor is used for the reflection wave sensor 6 and arranged at a position good for detecting the reflection wave of the detection wave from the display screen 3 to constantly monitor the intensity of the reflection wave.

The reflection wave sensor 6 is connected to switch 7 that is arranged to turn on/off the power source 4 for driving the lasers of the different colors and the detection wave and adapted to instantaneously turn off the switch 7 according to the detection signal of the reflection wave sensor 6 when the intensity of the reflection wave shows a change.

With the laser projector having the above configuration, when an obstacle (e.g., a viewer) intrudes into the projection area of the detection wave which is a pyramid-shaped space defined by the projection frame IR of the detection wave and the objective lens 2a, the detection wave is, if partly, intercepted by the obstacle to reduce the intensity of the reflection wave input to the reflection wave sensor 6.

Then, the reflection wave sensor 6 detects the reduction of the intensity of the reflection wave and recognizes as a result of the intrusion of an obstacle so that it feeds back the switch 7 with information on the detection and turns off the latter. As a result, the power source 4 for driving the lasers of the different laser beams of R, G and B is turned off to suspend the projection of the laser beams.

Therefore, if a viewer inadvertently intrudes into the laser beam projection area, he or she will not be exposed to laser beams for a prolonged period of time.

Particularly, by selecting a space for the projection area of the detection wave (which is a pyramid-shaped space defined by the projection frame IR or the detection wave and the objective lens 2a) larger than the space of the projection area of the laser beams (which is a pyramid-shaped space defined by the projection frame L of the laser beams and the objective lens 2a), the obstacle (viewer) firstly gets into the pyramid-shaped space defined by the projection frame IR of the detection wave and the objective lens 2a so that the laser beams will be effectively shut down before the obstacle (viewer) intrudes into the pyramid-shaped space defined by the projection frame L of the laser beams and the objective lens 2a.

Thus, the laser beams are shut down before the viewer intercepts the fluxes of laser beams and the viewer is prevented from being exposed to a laser beam for a prolonged period of time.

While a method of detecting the intensity of the reflection wave by means of the reflection wave sensor 6 and turning of the power source 4 for driving the lasers by means of the switch 7 according to the detection signal (change in the intensity) of the reflection wave sensor 6 for the laser beam shutdown mechanism in the above description, the present invention is by no means limited thereto and any other appropriate method may alternatively be used.

For example, a switching signal can be obtained by detecting any defect on the lines drawn on the display screen that is produced when the projected laser beams are intercepted or by directly detecting a black out on the display screen.

Additionally, the laser beams may alternatively be shut down by arranging a shutter at the objective lens 2a and operating the shutter when necessary. Still alternatively, the laser beams may be shut down by suspending the sweeping operation of the galvano-mirror of the optical modulator unit 2.

In a laser projector, the laser beams emitted from the laser beam source 1 are substantially collimated and made to sweep both horizontally and vertically by the optical modulator unit 2 before entering the objective lens 2a. Therefore, if the eyes of a viewer is directly exposed to the laser beams they can be considerably in danger depending on the output power level of the laser beams.

Therefore, this problem has to be dissolved by some means before a laser projector is subjected to practical use. However, according to the invention, this problem of danger can be reliably avoided by the above described arrangement.

While a detection wave projected from a detection wave source 5 is used to detect any obstacle intruding into the optical paths of the laser beams in the above description, the laser beams projected to produce a displayed image may be used for detecting the obstacle according to the invention.

Now, such an image projector will be described by referring to FIG. 2. Note that, in FIG. 2, the components same as those of FIG. 1 are denoted respectively by the same reference symbols and will not be described any further.

Figure 2:
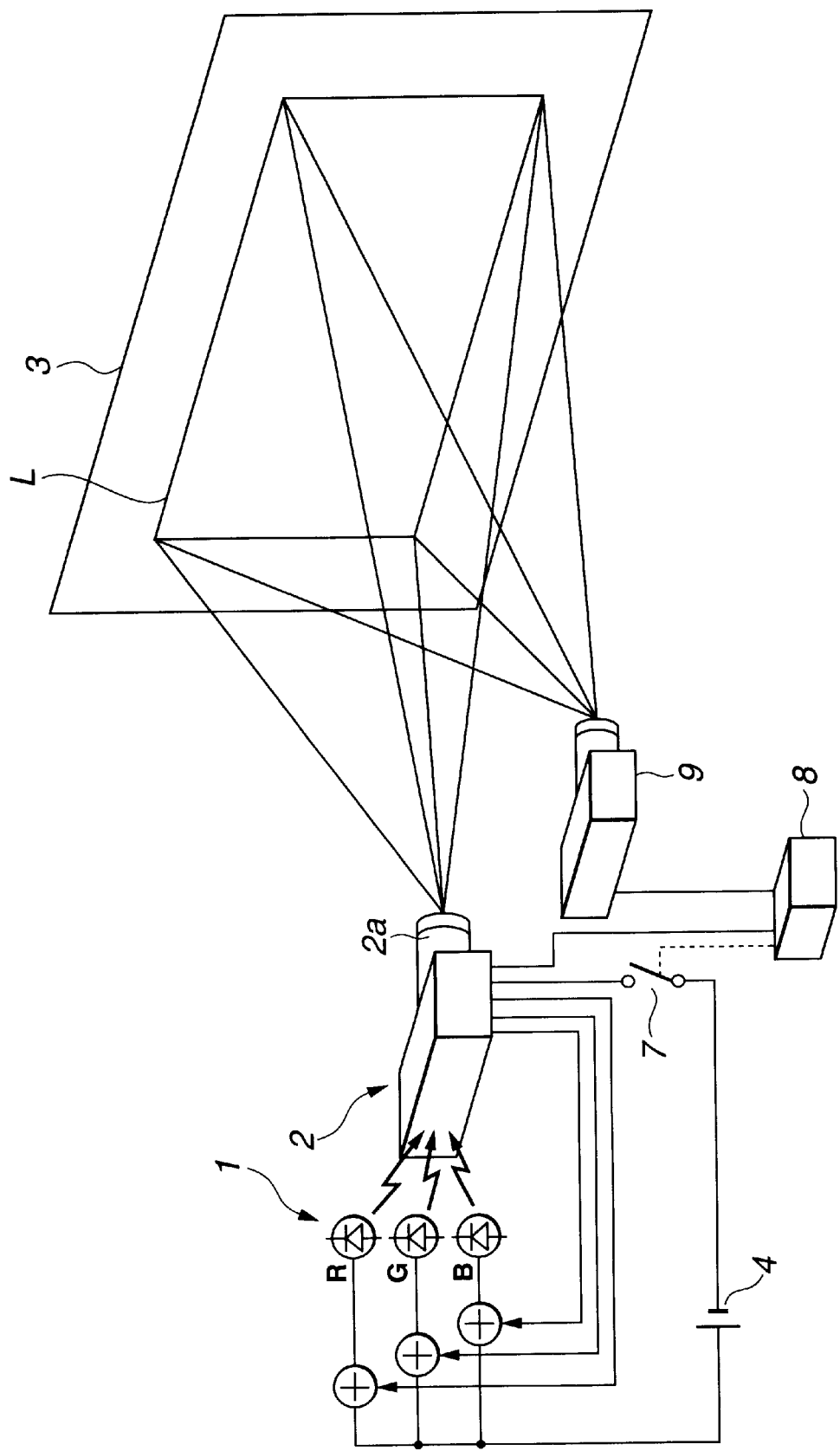
FIG. 2 is a schematic perspective view of another laser projector also realized by applying the present invention.

The image projector of FIG. 2 is provided with a safety mechanism adapted to prevent any viewer inadvertently intruding into the optical paths of the laser beams from being exposed to them for a prolonged period of time.

The image projector utilizes laser beams for the safety mechanism and comprises as principal components thereof a laser beam source 1, an image processing device 8 and an image pickup device 9.

The laser beams of different colors emitted from the laser beam source 1 are irradiated onto the display screen 3 by way of an objective lens 2a of the optical modulator unit 2 of the projector. The optical modulator unit 2 is connected to the image processing device 8 and therefore the image to be projected onto the display screen 3 is also transmitted to the image processing device 8.

On the other hand, the image pickup device 9 typically comprises a CCD (charge-coupled device) camera and arranged at a position adapted to pickup the image projected onto the display screen 3 to constantly monitor the displayed image.

The image pickup device 9 is also connected to the image processing device 8 so that it detects the displayed image and outputs it to the image processing device 8.

The image processing device 8 receives both the image to be displayed and the displayed image respectively form the optical modulator unit 2 and the image pickup device 9 and detects the difference between them. The image processing device 8 is also connected to switch 7 for tuning on/off the power source 4 for driving the lasers of the different colors so that, when it detects any difference between the image to be displayed and the displayed image, the switch 7 can be instantaneously turned off according to the detection signal from the image processing device 8.

With the laser projector having the above described configuration, when an obstacle (e.g., a viewer) intrudes into the projection area of the laser beams which is a pyramid-shaped space defined by the projection frame L of the laser beams and the objective lens 2a, the laser beams are shut down, if partly, by the obstacle to change the displayed image transmitted to the image processing device 8 to give rise to a difference between the image to be displayed and the displayed image.

Then, the difference between the image to be displayed and the displayed image is detected as intrusion of an obstacle and the information is immediately fed back to the switch 7 to turn off the latter. As a result, the power source 4 for driving the lasers of the different laser beams of R, G and B is turned off to suspend the projection of the laser beams.

Therefore, if a viewer inadvertently intrudes into the laser beam projection area, he or she will not be exposed to laser beams for a prolonged period of time.

Therefore, the risk of exposing a viewer to the laser beams for a prolonged period of time can be successfully avoided by shutting down the laser beams instantaneously according to the result of the detecting operation.

While a method of detecting the difference, if any, between the image to be displayed and the displayed image by means of the image processing device 8 and turning of the power source 4 for driving the lasers by means of the switch 7 according to the detection signal (change in the intensity) for the laser beam shutdown mechanism in the above description, the present invention is by no means limited thereto and any other appropriate method may alternatively be used. The laser beam shutdown mechanism of FIG. 1 may alternatively be used for the laser projector of FIG. 2.

Laser beams of the three colors of R, G and B may be projected from the respective lasers onto the detection area located outside the area for displaying the image as pin point. Then, the pin point projection of laser beams is by far safer to the viewer intruding into the projection area because the energy of the laser beam is very small.

Additionally, it may be so arranged that, when an obstacle intrudes into the projection area, the laser beams are shut down only in the inside of the boundary of the detected obstacle without shutting down all the lasers.

What is claimed is:

1. An image projection method for projecting laser beams onto a display screen to display an image, wherein a detection wave is projected onto the display screen along with the laser beams by way of objective lens of an optical modulator unit that also projects the laser beams, and the detection wave reflected by the display screen is detected so as to find out an obstacle intruding into the projection area of the laser beams.

2. The image projection method according to claim 1, wherein the detection wave is an infrared ray or an ultrasonic wave.

3. The image projection method according to claim 1, wherein the projection area of the detection wave is made larger than that of the laser beams.

4. The image projection method according to claim 1, wherein the laser beams are shut down upon detecting an obstacle intruding into the projection area of the laser beams.

5. An image projection method for projecting a projected image with laser beams onto a display screen to display an image within a projection area, the laser beams being projected by way of objective lens of an optical modulator unit, wherein the image displayed on the display screen is picked up, and a difference between the projected image to be displayed and the displayed image on the display screen with an obstacle intruding is detected so as to find out an obstacle is intruding into the projection area of the laser beams.

6. The image projection method according to claim 5, wherein the laser beams are shut down upon detecting an obstacle intruding into the projection area of the laser beams.

7. An image projection method for projecting laser beams onto a display screen to display an image, wherein the laser beams are projected also onto a detection area of the display screen located outside the displayed image by way of objective lens of an optical modulator unit, and the laser beams reflected by the detection area of the displayed screen are detected so as to find out an obstacle intruding into the projection area of the laser beams.

8. The image projection method according to claim 7, wherein the laser beams are shut down upon detecting an obstacle intruding into the projection area of the laser beams.

9. An image projector comprising:
a laser beam source for projecting laser beams by way of objective lens of an optical modulator unit to display an image;
a detection wave source for projecting a detection wave;
a display screen to which the laser beams and detection wave are projected;
a reflected wave detection means for detecting the detection wave reflected by the display screen so as to find out an obstacle intruding into the projection area of the laser beams; and
a laser beam shutdown mechanism for shutting down the laser beams according to the detection signal output from the reflected wave detection means.

10. An image projector comprising:
a laser beam source for projecting laser beams by way of objective lens of an optical modulator unit to display an image;
a display screen to which the laser beams are projected;
an image pickup means for picking up the image displayed on the display screen;
an image processing means for detecting the difference between the image to be displayed and the detection signal output from the image processing means.

11. An image projector comprising:
a laser beam source for projecting laser beams to display an image and also projecting laser beams onto a detection area located outside the displayed image by way of objective lens of an optical modulator unit;
a display screen to which the laser beams are projected;
a reflected beam detection means for detecting the laser beams reflected by the detection area of the display screen so as to find out an obstacle intruding into the projection area of the laser beams; and
a laser beam shutdown mechanism for shutting down the laser beams according to the detection signal output from the reflected beam detection means.

* * * * *